(12) United States Patent
Hehir et al.

(10) Patent No.: US 8,739,155 B2
(45) Date of Patent: May 27, 2014

(54) PROVIDING GUIDANCE FOR SOFTWARE INSTALLATION

(75) Inventors: Sally A. Hehir, Arlington, MA (US); Lee J. Reamsnyder, Carrboro, NC (US); Brian C. Schimpf, Harvard, MA (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 13/540,807

(22) Filed: Jul. 3, 2012

(65) Prior Publication Data
US 2014/0013319 A1    Jan. 9, 2014

(51) Int. Cl.
*G06F 9/445*    (2006.01)
(52) U.S. Cl.
USPC .......................................... 717/176; 717/171
(58) Field of Classification Search
CPC ...................................................... G06F 8/61
USPC .................................. 717/176–178
See application file for complete search history.

(56) References Cited

U.S. PATENT DOCUMENTS

| | | | |
|---|---|---|---|
| 7,228,542 B2 * | 6/2007 | Bryant et al. | 717/177 |
| 7,624,086 B2 | 11/2009 | Keith, Jr. | |
| 8,432,568 B2 * | 4/2013 | Yamaguchi | 358/1.15 |
| 8,495,615 B2 * | 7/2013 | Alberti et al. | 717/172 |
| 2004/0123284 A1 * | 6/2004 | Bryant et al. | 717/174 |
| 2005/0251786 A1 | 11/2005 | Citron et al. | |
| 2009/0293053 A1 | 11/2009 | Knatcher | |

OTHER PUBLICATIONS

U.S. Appl. No. 13/540,807, entitled "Providing Guidance for Software Installation" filed Jul. 3, 2012.

* cited by examiner

*Primary Examiner* — Phillip H Nguyen
(74) *Attorney, Agent, or Firm* — Isaac J. Gooshaw

(57) ABSTRACT

A computer receives information from a user, which includes the identity of and installation preferences for the software to be installed on a second computer. Information about the environment of the second computer is gathered by the computer. The computer defines a set of search parameters based on the information received and the environment of the second computer. The computer searches for data stored on storage devices and the Internet. The computer retrieves the data, associated to a second installation of the software on a third computer, which relates to the installation of software on the second computer. The computer generates guidance for installation of the software on the second computer, based on the identity of the software to be installed, installation preferences for the software to be installed, the environment of the second computer, and the data associated to an installation of the software on a third computer.

13 Claims, 3 Drawing Sheets

PROVIDING GUIDANCE FOR SOFTWARE INSTALLATION

FIELD OF INVENTION

The present invention relates in general to the field of software installation, and more particularly to provide guidance to the administrators performing software installations.

BACKGROUND

Installation of complex software systems typically involves many options allowing for numerous combinations of possible scenarios. The user performing the installation often needs guidance in making choices and understanding the potential implications of those choices. Installation software generally includes warning messages and other guidance to the users during the installation of the software.

Some existing software installation systems create software packages and include an installation wizard to help the user through the installation process and pre-check the computing environment for software prerequisites. However, if a specialized software package or software update installed on a computer was released after the software installation wizard was released, complications during the installation process may arise because each software update and specialized software package may necessitate alterations in the new software's installation parameters.

Often the information the user needs to understand is present in multiple different sources and repositories, including product help, white papers, technical support bulletins and advisories, websites, and on-line forums, etc. This information may be extensive and the vast majority of the information may not be applicable to the specific installation the user is attempting. Further, it may be difficult for the providers of this information to ensure that the information is adequately current and accurate to match the particular software being installed.

SUMMARY

Embodiments of the present invention provide a system, method, and program product to generate guidance for installing software on a second computer. The first computer receives information from a user, which includes the identity and the installation preferences of the software to be installed on the second computer. The first computer gathers information about the environment of the second computer. Search parameters are defined by the first computer based on the information received and the information gathered regarding the environment of the second computer. A search is conducted by the first computer for data stored on local storage devices and stored within the Internet. The computer retrieves data associated with an installation of the software on a third computer. The computer generates guidance for the installation of the software on the second computer. In certain embodiments, to generate guidance, the computer sorts, analyzes, verifies and presents the data to the user.

In certain embodiments, the computer generates a file comprising information received from a user and the second computer's registry. The computer may then use the information stored in the file to define search parameters. The search parameters may also be based on information located in a file provided by another user.

DETAILED DESCRIPTION

Embodiments of the present invention will now be described in detail with reference to the accompanying drawings. The following is intended to provide a detailed description of various embodiments of the present invention as examples of the invention, and should not be taken to be exhaustive nor limit the invention to the precise forms disclosed. Many modifications and variations are possible. Such modifications and variations that may be apparent to a person skilled in the art of the invention are intended to be included within the scope of the invention as defined by the accompanying claims that follow the description.

Figure 1:
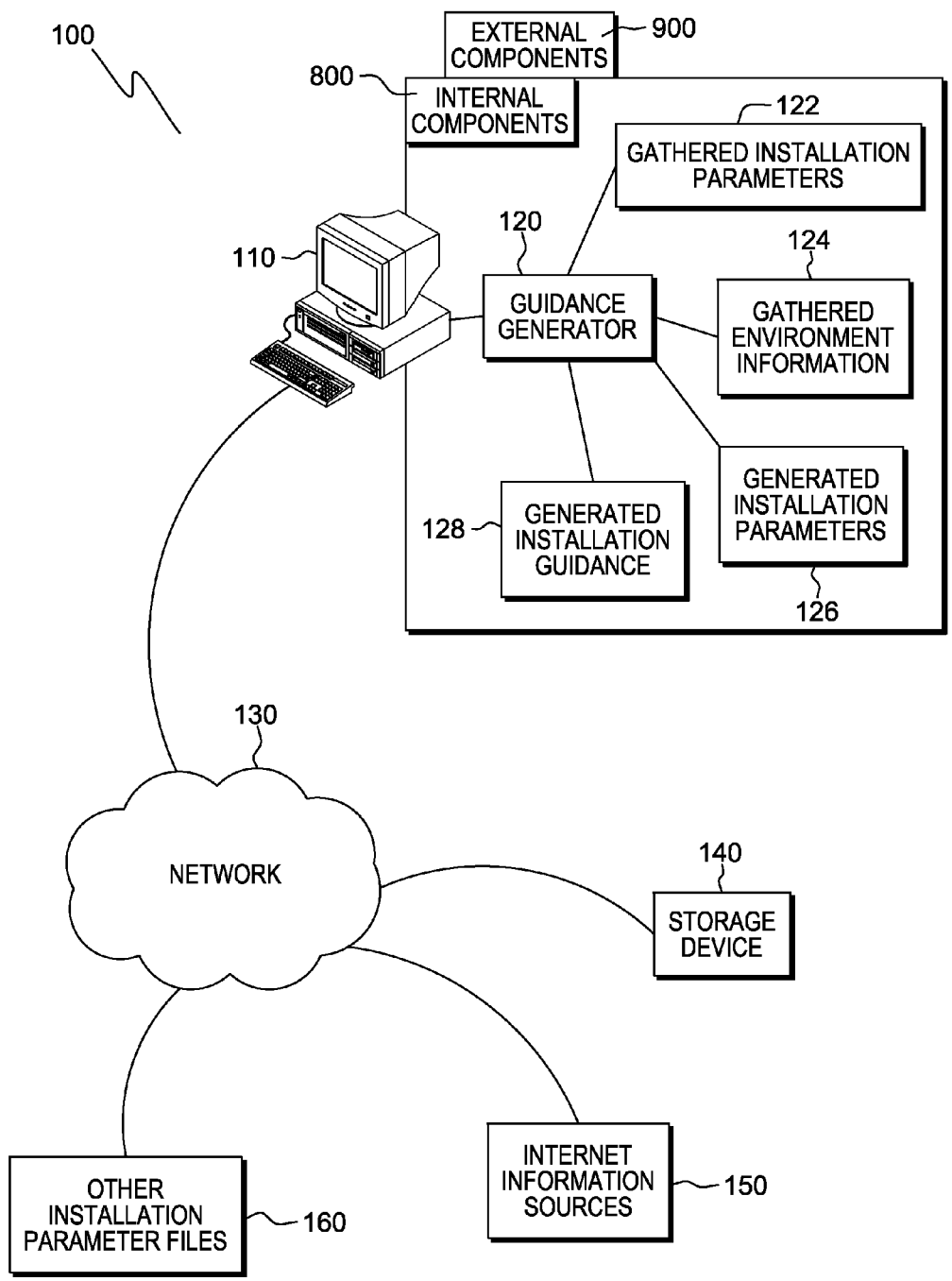
FIG. 1 is a block diagram of guidance system in accordance with an embodiment of the present invention.

FIG. 1 is a block diagram illustrating guidance system 100 for generating installation guidance in accordance with one embodiment of the present invention. System 100 includes computer 110 which is connected, via network 130, to storage device 140, internet information sources 150, and other installation parameter files 160. In this exemplary embodiment, storage device 140, internet information sources 150, and other installation parameter files 160 are located external to computer 110. Network 130 may be, for example, a local area network (LAN), a wide area network (WAN) such as the Internet, or a combination of the two, and include wired, wireless, or fiber optic connections. In general, network 130 may be any combination of connections and protocols that will support communications between computer 110, storage device 140, internet information sources 150, and other installation parameter files 160 in accordance with an exemplary embodiment of the present invention.

In this embodiment of the present invention, computer 110 may be a server, a laptop, a tablet, a netbook personal computer (PC), or a desktop computer. In another embodiment, computer 110 represents a computing system utilizing clustered computers and components to act as a single pool of seamless resources when accessed through network 130, e.g., clustered computers representing a datacenter for a cloud computing application. In general, computer 110 may be any computing device or a combination of devices capable of communication with network 130 and running guidance generator 120. In an exemplary embodiment, computer 110 represents the second computer where a new installation file is to be installed. In other exemplary embodiments, computer 110 may represent a first computer running guidance generator 120 to facilitate the installation of software on a second computer.

In an exemplary embodiment, storage device 140, internet information sources 150 and other installation parameter files 160 are accessed by computer 110 via network 130, and information relating to the installation of new software feature on a second computer is retrieved. Two examples of storage device 140 are software defect databases and software support databases. Examples of information that could be found on internet information sources 150 includes, but are not limited to: product help sites, white papers, user forums, technical support bulletins and advisories. Using an internet search engine is very useful in locating information relating to the new software installation. For example, guidance generator 120 uses one of the many commercially and privately available internet search engines that are capable of running a keyword or key phrase search to locate the relevant information regarding an installation of new software feature on computer 110. The files and sources of information associated with guidance generator 120 may vary in other embodiments of the invention.

Other installation parameter files 160 include installation parameter files found by other users to be effective in the installation of a specific software product. Other installation parameter files 160 contain information related to a software configuration used for an installation of the new software feature on a third computer, as well as the associated environment information of the third computer. Other installation parameter files 160 may include information, such as previously installed software and changes made to the setting and configuration of previously installed software to facilitate the installation of the new software feature. Other installation parameter files 160 may also include pre- and post-installation tasks completed, installation complications experienced, and the relevant hardware of the computer on which the new software was installed. By using a set of installation parameters that other users have found to be effective, a new software feature installation could be greatly facilitated. The content and location of other installation parameter files 160 may vary in other embodiments of the invention.

In an exemplary embodiment, computer 110 locally includes guidance generator 120, which has access to gathered installation parameters 122. Computer 110 may also locally include gathered environment information 124, generated installation parameters 126, and generated installation guidance 128. In other embodiments, guidance generator 120, gathered installation parameters 122, gathered environment information 124, generated installation parameters 126 may be located externally in various storage devices. Computer 110 would access gathered installation parameters 122, gathered environment information 124, generated installation parameters 126, and generated installation guidance 128 using network 130. The network may be, for example, a local area network (LAN), a wide area network (WAN) such as the Internet, or a combination of the two, and may include wired, wireless, fiber optic or any other connection known in the art. In general, the network may be any combination of connections and protocols that would support communications between computer 110 and the various storage devices containing guidance generator 120, gathered installation parameters 122, gathered environment information 124, generated installation parameters 126 in accordance with an exemplary embodiment of the present invention. Access to files and sources of information may vary in other embodiments of the invention.

In an exemplary embodiment of the invention, guidance generator 120 includes a logic engine, a set of parameters for sorting search results into categories, and a variety of templates for use in presenting search results to a user. The user, in this embodiment, is a user who is generating installation guidance using guidance generator 120.

In an example, guidance generator 120 presents the user with static and dynamic questions regarding the preferences associated with the installation of a new software product by displaying the questions on the monitor of computer 110. A set of static questions, which the user answers, may be directed to the level of detail the user desires to use in the search. Depending on how specific the user desires to be, guidance generator 120 presents a series of dynamic questions that depend on the level of specificity chosen by the user and relate to the static question answers provided by the user. In response to the answers provided by the user, guidance generator 120 may determine that more information is necessary to define installation parameters for the new software feature, and present more questions to the user. The responses to the questions are used to generate the gathered installation parameters 122. Detailed information regarding the questions presented to the user and the generation of gathered installation parameters 122 may be found in the discussion of FIG. 2. The contents of guidance generator 120 and steps used to gather information regarding the installation of new software feature may vary in other embodiments of the invention.

Based on the responses provided by the user, guidance generator 120 may access the system registries of the second computer where the new software feature will be installed. The responses to the questions provided to the user and information from the second computer registries are used to generate the gathered environment information 124. Some examples of information included in gathered environment information 124 are the hardware, software and connectivity information relevant to the installation of the new software feature on computer 110. Detailed information regarding gathered environment information 124 is described in the description of FIG. 2. The technique used to gather information regarding the environment of the second computer may vary in other embodiments of the invention.

Using information from gathered installation parameters 122 and gathered environment information 124, guidance generator 120 produces generated installation parameters 126. In an exemplary embodiment, generated installation parameters 126 is an XML file, which contains all the relevant information required for guidance generator 120 to run a search, using network 130, storage device 140, internet information sources 150, and other installation parameter files 160, to locate guidance information related to the installation of the new software feature. In other embodiments, the information sources utilized in the production of generated installation parameters 126 may vary.

In this exemplary embodiment, guidance generator 120 uses generated installation parameters 126 to run a query, via network 130, using the information in storage device 140, internet information sources 150, and other installation parameter files 160, to search for information relating to the installation of the new software feature. In one example, the query is based on a search engine using a keyword or key phrase to probe the Internet. The search returns correlated results, which are results that match the search parameter and are identified as relevant information pertaining to the installation of the new software feature on the second computer. The process of generating search results correlated to the installation of the new software feature is further explained below, within the description of FIG. 2. In other embodiments of the invention, guidance generator 120 may use different parameters and information to run a query.

Using the correlated results, guidance generator 120 generates feedback for the user. The feedback that is generated may include, but is not limited to: pre- and post-installation tasks, recommendations and warnings related to the installation of the new software feature. If the search results yield warnings, identifies installation issues and/or generates recommendations, then the information associated with warnings, installation issues and recommendations may be sent to the user, by guidance generator 120, and may be used to further modify the installation parameters before installation guidance is generated. If the user determines that a change in installation parameters is appropriate or desirable, after an update to generated installation parameters 126, another search may be initiated. The information used to generate feedback, as well as the contents of the feedback, may vary in other embodiments of the invention.

The correlated results combined with information from gathered installation parameters 122 and gathered environment information 124 are used by guidance generator 120 to produce generated installation guidance 128. As an example, the application of a three-pronged approach may be used to generate guidance from the correlated results, combined with information from gathered installation parameters 122 and gathered environment information 124. The correlated search results may be sorted into standard categories as defined by guidance generator 120. After the correlated search results are sorted, the correlated search results may be analyzed by guidance generator 120 to verify that the information contained within the correlated search results is consistent with the installation parameters stored in generated installation parameters 126. After the correlated results are verified, the correlated search results may be input into the appropriate fields of a template. The completed template is designated as generated installation guidance 128. More information regarding the production of generated installation guidance 128 is described hereafter within the description of FIG. 2. The sources of information and steps used to generate installation guidance, as well as the contents of generated installation guidance 128, may vary in other embodiments of the invention.

In this embodiment, generated installation guidance 128 contains all the identified warnings, installation issues, pre- and post-installation tasks, and recommendations related to the installation of the new software feature on the second computer. In this embodiment the generated installation guidance 128 operates independently from an installation wizard. However, in other embodiments it may be incorporated into an installation wizard to provide pre-installation guidance.

Figure 2:
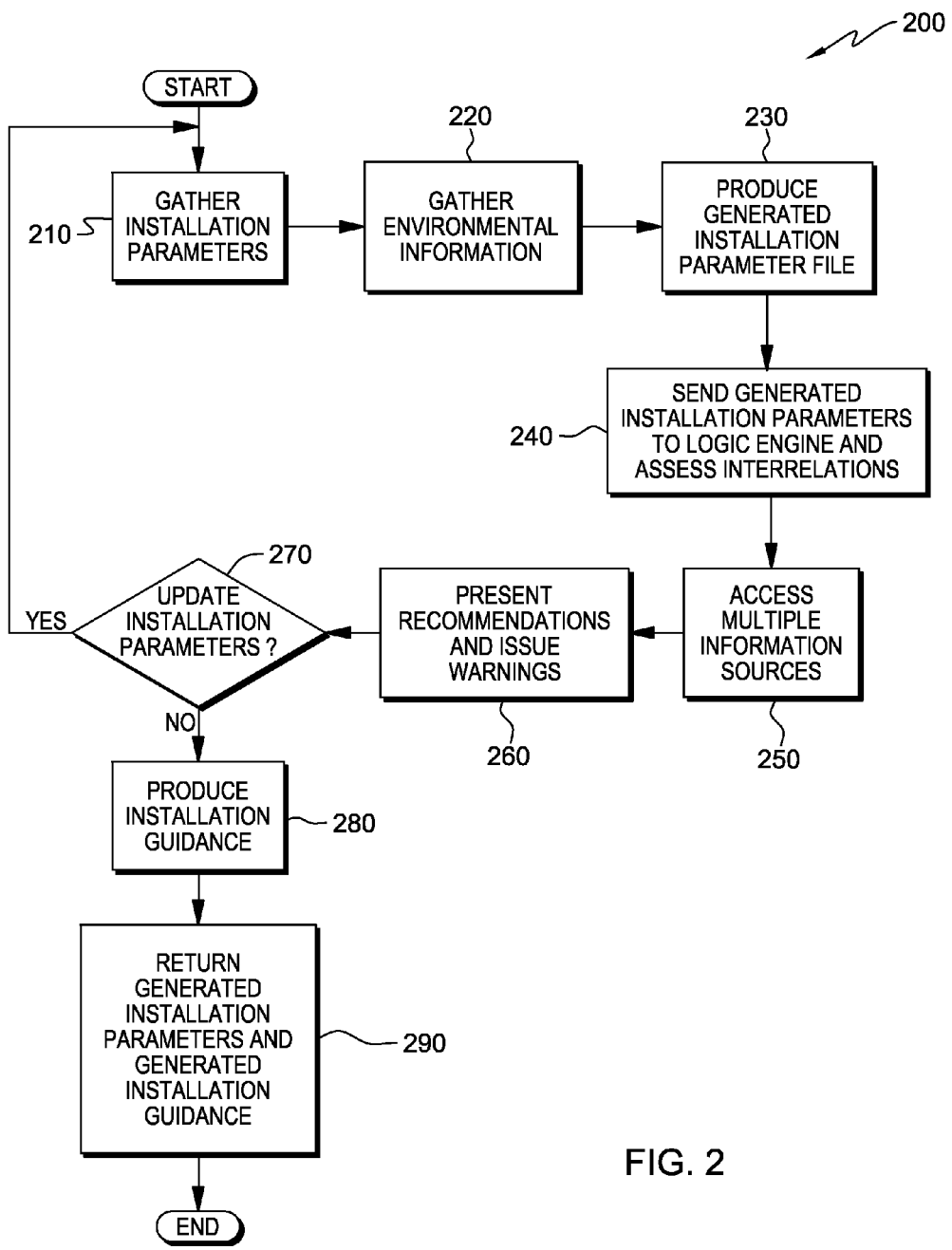
FIG. 2 is a flowchart illustrating the steps of a guidance generator software of FIG. 1 in accordance with an embodiment of the present invention.

FIG. 2 is a flowchart 200 illustrating guidance generator 120, running on computer 110, depicting the steps of generating guidance for software installation. The steps, and the order of the steps, utilized by other embodiments of guidance generator 120 may vary.

In this exemplary embodiment, the guidance generator application is installed on the first computer at the beginning of step 210. In other embodiments the guidance generator application is able to come preinstalled on the first computer or may be downloaded to the first computer as needed, using a method known in the art.

In this exemplary embodiment, during step 210, guidance generator 120, which is operated by computer 110, presents to the user a series of static and dynamic questions corresponding to software installation parameters. The first questions posed are typically static and determine the general scope of the installation query to be conducted. For example, a simple static questions regarding the installation parameters of the new software feature is "What is the name and version of the software to be installed?". Based on the replies to the static questions a determination is made, by guidance generator 120, as to whether further questions need to be presented to the user. If a positive determination is made that further questions are required, then dynamic questions are presented to the user. Two examples of a dynamic questions are "What version of the software is being installed?" and "What components of the software will be installed?". The responses to software installation parameter questions are saved by guidance generator 120, on a storage device accessible by computer 110, as gathered installation parameters 122 in FIG. 1. The content and method of generating questions and receiving responses from a user may vary in other embodiments of the invention. The content of gathered installation parameters 122 and technique of gathering software installation parameters may vary in other embodiments.

In this exemplary embodiment, during step 220, guidance generator 120, which is operated by computer 110, poses, to the user, a series of static and dynamic questions which correspond to the environment information of the second computer. Two examples of a static questions regarding the second computer's environment are "What is the operating system of the destination computer?" and "How many hard drives are present?". Based on the replies to the static questions a determination is made, by guidance generator 120, as to whether further questions need to be presented to the user. If a positive determination is made that further questions are required, then dynamic questions are presented to the user. An example of a dynamic question regarding the environmental information of the second computer is "What are the storage capacities of the hard drives?". The responses to software installation parameter questions are saved by guidance generator 120, on a storage device accessible by computer 110, in gathered installation parameters 122 as seen in FIG. 1. The content of and method of generating questions and receiving responses from a user may vary in other embodiments of the invention. The content of gathered installation parameters 122 and technique of gathering installation parameters may vary in other embodiments.

In an exemplary embodiment, in step 220, the user may grant permission for guidance generator 120 to access the system registries of the second computer. Once accessed, the registry could provide detailed environment information including but not limited to the hardware and software of the second computer. The responses of the user to second computer environment related questions and the accessed registry information are saved by guidance generator 120, on a storage device accessible by computer 110, as gathered environment information 124. If access to the registries is not possible, then the user could be given the option of entering the second computer's environment information manually. Regardless of the source, in this embodiment, the second computer information received is saved, by guidance generator 120, as gathered environment information 124. The content of gathered environment information 124 and the technique of gathering second computer environment information may vary in other embodiments.

An installation parameter file is generated using information from gathered installation parameters 122 and gathered environment information 124, during step 230. The accessed information from gathered installation parameters 122 and environment information 124 are sorted and combined to create a file, designated as generated installation parameters 126 in FIG. 1. Generated installation parameters 126 could be used to generate installation guidance for a single installation or many installations. In this embodiment of the invention, generated installation parameters 126 is an XML file. The same file could also be used in a scenario in which the user wishes to install the same software on multiple computers with shared environment characteristics. If there are specific differences between the computers, then the varied information could be either entered by the user or accessed from the second computer's system registry. For example, a user has ten computers, with identical hardware and varied software installed, and wants to install a new software product on all ten computers; the user could then save time by uploading a file, during step 210, for use by guidance generator 120, containing hardware information and new software feature installation preferences. The remaining environment information could be obtained from each second computer's registry on an individual basis. The information contained in or used to create generated installation parameters 126 may vary in other embodiments of the invention.

In a further example relating to step 210 and 220, instead of the user providing the information via responses to questions, some or all of the information could be uploaded from a previously created installation file. The file need not be generated by the user but could be obtained from a second user using a variety of techniques, including internet downloads. In this embodiment, downloaded installation parameter files are designated as other installation parameter files 160. For example, a user working in an office wants to install software X on his or her computer, but does not want to waste time answering questions or determining the appropriate configuration for the new software feature. So, the user searches the local office server for other installation parameter files 160, which contains information relating to the installation of the software product, and uploads the other installation parameter files for use by guidance generator 120.

In step 240, generated installation parameters 126 is sent to guidance generator 120 for assessment. During the assessment, guidance generator 120 identifies keywords, key phrases, and the interrelations between the installation parameters and second computer environment, for use as search parameters. For example, keywords to be used as search parameters may be the name of the software to be installed and the operating system of the second computer. A key phrase may be a specific installation preference such as "basic installation" or "full installation". The interrelations, for example, may identify known conflicts between selected installation preferences or between installed software and the new software feature. The interrelations may also identify that the new software feature will interact with or affect the function of installed software. Guidance generator 120 may also identify conflicts between hardware configurations and the new software feature. The result of the assessment, in step 240, is the generation of site specific parameters that may be used in a search for new software installation information. In other embodiments the assessment and processing of generated installation parameters 126 and identification of potential search parameters, i.e., keywords, key phrases etc., may vary.

The site specific parameters are used to search for installation information in step 250. Using the identified keywords, key phrases, interrelations along with the information from generated installation parameters 126, guidance generator 120 searches multiple sources for information relating to the installation of the new software feature on the second computer. For example, guidance generator 120 searches the internet using various search engines and the identified keywords and key phrases, FIG. 1 internet information sources 150. Further, the hardware and software configuration information of the second computer is used to search internet information sources 150 for comments and advice provided by other users. Continuing with the example, multiple databases are queried for reported new software defects, incompatibilities, white pages, technological notes and journals. The types of searches performed may vary with each installation based on the second computer and new software features to be installed. Since, the information returned with the search is dynamic and subject to update, the results returned may vary with each search even though the search parameters have not changed. This provides a scenario in which the guidance provided by guidance generator 120 may incorporate updated information released after the new software feature was released. The methods and steps used in searching for installation information, related to the installation of a new software product on a second computer, may vary in other embodiments of the invention.

In general, more specific guidance may be generated as more detail regarding the second computer's environment and software installation preferences is provided. As an example, guidance generator 120 may be used with only the name of the software to be installed and none of the environment information of the second computer. However, a search using so few parameters could generate such a large amount of information that the specificity of the installation guidance could be limited. Conversely, providing more detailed information regarding the second computer environment could allow for the generation of installation guidance that is highly applicable to the second computer. The number of returned pieces of information in relation to the number of supplied pieces of information may vary in other embodiments of the invention.

Based on the returned search results of step 250, guidance generator 120 presents warnings and recommendations to the user in step 260. In step 270, the warnings and recommendations may prompt the user to alter some of the installation preferences for the new software feature or may result in a decision to not install the software at all. For example, a warning of a fatal incompatibility of the new software feature with the operating system may dissuade the user from installing the software. In a further example, a recommendation to change the installed features is presented to the user to better integrate the new software feature with the existing software. The user changes the specified install features for the new software and guidance generator 120 runs another search. The final search results are compiled for future use by guidance generator 120. The contents, treatment and use of the returned search results may vary in other embodiments of the invention.

In an exemplary embodiment of the invention, if the user confirms the selected installation parameters in step 270, then guidance generator 120, uses the compiled search results to generate installation guidance in step 280. The compiled results are sorted into standard categories based on the content and the heading under which each result falls. For example, you may have three results returned that all include a recommendation to partition the hard drive before installation. These three recommendations would be grouped together along with any other recommendation referring to hard drive partitioning. The sorted results are analyzed by guidance generator 120 to verify that the consistency of the information present with the installation parameters stored in generated installation parameters 126. For example, a result is returned that matches the selected installation features but the result is reference to an installation with a different operating system. In this example, the result is rejected. This process could filter out information that may have been returned but does not apply or is not relevant to the installation of the new software feature on the second computer. The verified results are applied to the appropriate fields of a template which is sent to the user. The template is used to organize the remaining search results and present them as pre- and post-installation tasks, recommendations and warnings. In this embodiment, the use of a template allows numerous results to be presented to the user in a meaningful way such that they may not be overwhelmed with large numbers of repetitious or disorganized results. For example, there may be a recommendation that the user avoids installing a particular new software feature and the recommendation appears in one hundred and fifty six results. All of the results would be condensed into a single entry on the template. The template product is saved as a file designated as generated installation guidance 128, FIG. 1. The results of the search may not be processed or presented in the same manner in certain embodiments of the invention.

In step 290 of this embodiment, generated installation guidance 128 and generated installation parameters 126 are returned to the user. Generated installation parameter file 126 may be saved and reused for future installations and sent to a second user for use by the second user. The information in generated installation guidance 128 may be used in conjunction with the installation of the new software feature on the second computer or saved for later reference. The return of generated installation guidance 128 and generated installation parameters 126 may vary in other embodiments of the invention.

Figure 3:
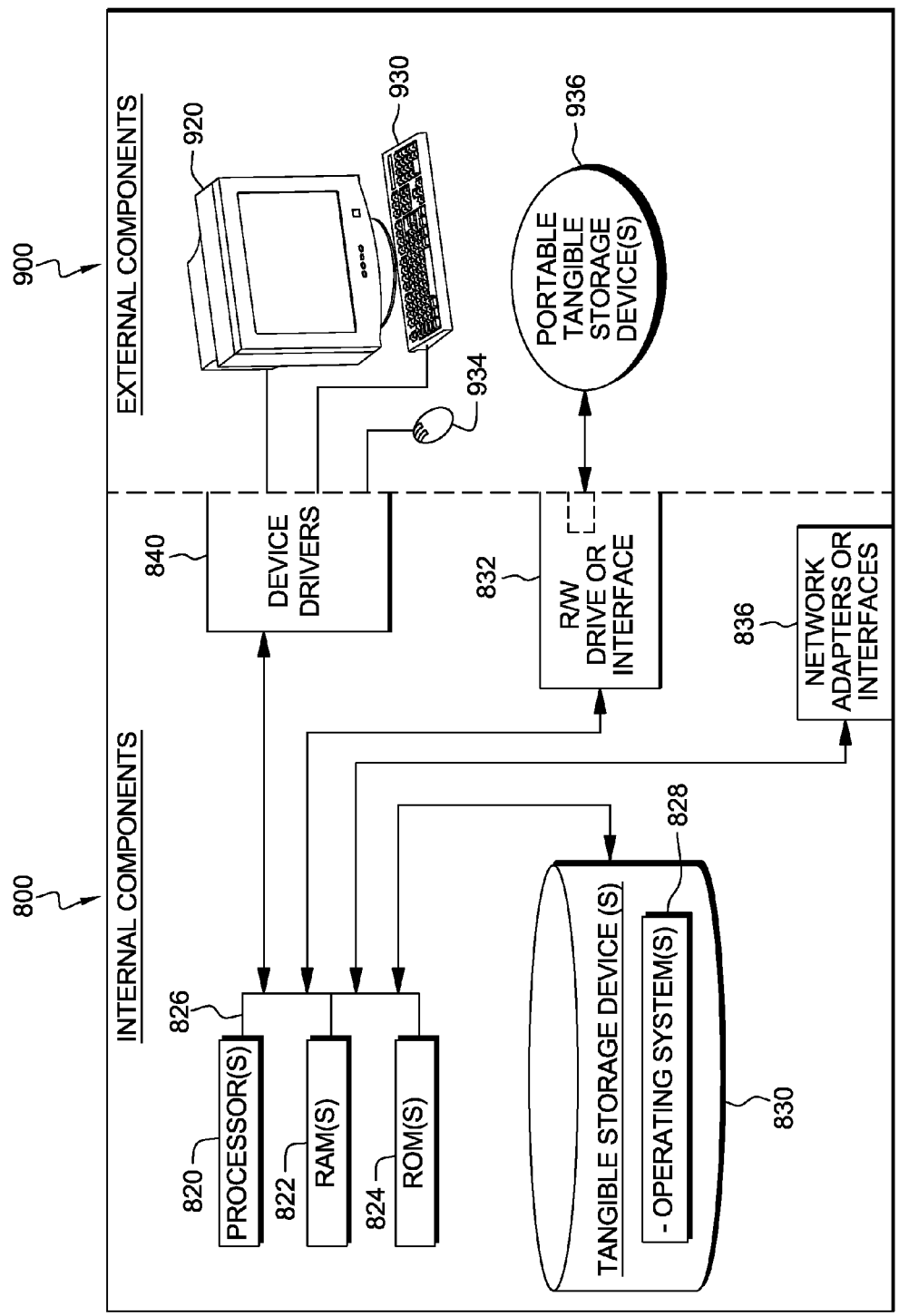
FIG. 3 is a block diagram of internal and external components within the computing devices of FIG. 1 in accordance with an embodiment of the present invention.

FIG. 3 shows a block diagram of the components of a data processing system 800, 900, such as computer 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 110 includes respective sets of internal components 800 and external components 900 illustrated in FIG. 3. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems, and guidance generator 120 in computer 110, are stored on one or more of the respective computer-readable tangible storage devices 830 for execution or access by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that may store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. Guidance generator 120 in computer 110, may be stored on one or more of the respective portable computer-readable tangible storage devices 936, read via the respective R/W drive or interface 832 and loaded into the respective hard drive 830.

Each set of internal components 800 also includes network adapters or interfaces 836 such as a TCP/IP adapter cards, wireless wi-fi interface cards, or 3G or 4G wireless interface cards or other wired or wireless communication links. Guidance generator 120 in computer 110 may be downloaded to computer 110 from an external computer via a network (for example, the Internet, a local area network or other, wide area network) and respective network adapters or interfaces 836. From the network adapters or interfaces 836, guidance generator 120 in computer 110, is loaded into the respective hard drive 830. The network may comprise copper wires, optical fibers, wireless transmission, routers, firewalls, switches, gateway computers and/or edge servers.

Each of the sets of external components 900 may include a computer display monitor 920, a keyboard 930, and a computer mouse 934. External components 900 may also include touch screens, virtual keyboards, touch pads, pointing devices, and other human interface devices. Each of the sets of internal components 800 also includes device drivers 840 to interface to computer display monitor 920, keyboard 930 and computer mouse 934. Device drivers 840, R/W drive or interface 832 and network adapters or interfaces 836 comprise hardware and software (stored in storage device 830 and/or ROM 824).

The aforementioned programs may be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs may be implemented in whole or in part by computer circuits and other hardware (not shown).

One of the preferred implementations of the invention is an application, namely, a set of instructions (program code) in a code module which may, for example, be resident in the random access memory of the computer. Until required by the computer, the set of instructions may be stored in a third computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

Based on the foregoing, computer system, method and program product have been disclosed in accordance with the present invention. However, numerous modifications and substitutions may be made without deviating from the scope of the present invention. Therefore, the present invention has been disclosed by way of example and not limitation.

What is claimed is:

1. A computer system to generate guidance for installing software on a second computer, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, the program instructions comprising:
   program instructions to receive information from a user, which includes, at least in part, an identity of a software to be installed, installation preference for a first installation of the software, and a software feature to be installed on a second computer;
   program instructions to receive information regarding one or more of connectivity, hardware, and currently installed software on the second computer that defines an environment of the second computer;
   program instructions to define a search parameter based on (i) a received information from the user and (ii) a received information that defines the environment of the second computer;
   program instructions to search, using the search parameter, for data stored on storage devices and the Internet;
   program instructions to retrieve data, which is associated with a second installation of the software on a third computer, wherein data associated with the second installation relates to the installation of software on the second computer; and
   program instructions to generate guidance for the installation of the software on the second computer, based on the identity of the software to be installed, the installation preference for the first installation of the software, the environment of the second computer, and the data associated to a second installation of the software on a third computer.

2. A computer system in accordance with claim 1, wherein a retrieved data relating to the installation of the software on the third computer includes at least one of installation preference, pre- and post- installation tasks, installed software features, computer environment information, recommendations, warnings, identified installation issues, and information regarding a software installation experience of a second user.

3. A computer system in accordance with claim 1, wherein generated guidance includes at least one of warnings, recommendations, pre- and post- installation tasks, and identified installation issues.

4. A computer system in accordance with claim 1, wherein the step of receiving information about a second installation of the software further comprises:
   program instructions to generate a first file including information received from a first user and a second computer registry, which includes at least one of the installation preference for a first installation the software, the software feature to be installed on the second computer, and information regarding the hardware, the connectivity, and currently installed software which comprises the environment of the second computer; and
   program instructions to define search parameters using information stored in the first file.

5. A computer system in accordance with claim 1, wherein the step searching storage devices and the Internet comprises:
   program instructions to define the search parameter using information from a second file provided by a second user.

6. A computer system in accordance with claim 1, wherein the step of generating guidance comprises:
   program instructions to sort data associated with a second installation of a software into categories;
   program instructions to analyze an identified data associated with a second installation of the software;
   program instructions to verify a consistency of the identified data associated with a second installation of the software with an installation preference for the first installation of a software; and
   program instructions to return an identified data associated with a second installation of the software to a first user.

7. A computer program product to generate guidance for installing software on a second computer, the computer program product comprising:
   one or more computer-readable storage devices and program instructions stored on at least one of the one or more tangible storage devices, the program instructions comprising:
   program instructions to receive information from a user, which includes, at least in part, an identity of a software to be installed, installation preference for a first installation of the software, and a software feature to be installed on a second computer;
   program instructions to receive information regarding one or more of connectivity, hardware, and currently installed software on the second computer that defines an environment of the second computer;
   program instructions to define a search parameter based on (i) a received information from the user and (ii) a received information that defines the environment of the second computer;
   program instructions to search, using the search parameter, for data stored on storage devices and the Internet;
   program instructions to retrieve data, which is associated with a second installation of the software on a third computer, wherein data associated with the second installation relates to the installation of software on the second computer; and
   program instructions to generate guidance for the installation of the software on the second computer, based on the identity of the software to be installed, the installation preference for the first installation of the software, the environment of the second computer, and the data associated to a second installation of the software on a third computer.

8. A computer program product in accordance with claim 7, wherein a retrieved data relating to the installation of the software on the third computer includes at least one of installation preference, pre- and post- installation tasks, installed software features, computer environment information, recommendations, warnings, identified installation issues, and information regarding a software installation experience of a second user.

9. A computer program product in accordance with claim 7, wherein generated guidance includes at least one of warnings, recommendations, pre- and post-installation tasks, and identified installation issues.

10. A computer program product in accordance with claim 7, wherein the step of receiving information about a second installation of the software further comprises:

program instructions to generate a first file including information received from a first user and a second computer registry, which includes at least one of the installation preference for a first installation the software, the software feature to be installed on the second computer, and information regarding the hardware, the connectivity, and currently installed software which comprises the environment of the second computer; and program instructions to define search parameters using information stored in the first file.

11. A computer program product in accordance with claim 7, wherein the step searching storage devices and the Internet comprises:

program instructions to define the search parameter using information from a second file provided by a second user.

12. A computer program product in accordance with claim 7, wherein the steps of receiving information from the user and about the environment of the second computer comprises:

program instructions to display a question to a first user, which corresponds to an installation parameter of the software to be installed and corresponds to the environment of the second computer;

program instructions to receive an information from the first user, which includes one or more of an installation parameter and information regarding the environment of the second computer, and in response to the receiving, determining whether to display further questions;

program instructions to, responsive a positive determination to display further questions, the first computer displaying one or more questions to the first user; and program instructions to access, based on a response to a question, relevant information from a registry of the second computer, if said registry is available.

13. A computer program product in accordance with claim 7, wherein the step of generating guidance comprises:

program instructions to sort data associated with a second installation of a software into categories;

program instructions to analyze an identified data associated with a second installation of the software;

program instructions to verify a consistency of the identified data associated with a second installation of the software with an installation preference for the first installation of a software; and program instructions to return an identified data associated with a second installation of the software to a first user.

* * * * *